(12) United States Patent
Chandelier et al.

(10) Patent No.: US 12,429,013 B2
(45) Date of Patent: Sep. 30, 2025

(54) THRUST REVERSER COMPRISING MEANS FACILITATING THE MOUNTING OF A MEMBRANE FOR SEALING OFF THE SECONDARY FLOW PATH

(71) Applicant: SAFRAN NACELLES, Gonfreville-l'Orcher (FR)

(72) Inventors: Julien Chandelier, Moissy-Cramayel (FR); Patrick Gonidec, Moissy-Cramayel (FR); François Bellet, Moissy-Cramayel (FR); Patrick André Boileau, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 19/111,134

(22) PCT Filed: Sep. 8, 2023

(86) PCT No.: PCT/FR2023/051348
§ 371 (c)(1),
(2) Date: Mar. 12, 2025

(87) PCT Pub. No.: WO2024/062174
PCT Pub. Date: Mar. 28, 2024

(65) Prior Publication Data
US 2025/0243826 A1    Jul. 31, 2025

(30) Foreign Application Priority Data

Sep. 20, 2022    (FR) ..................................... 2209510

(51) Int. Cl.
*F02K 1/72* (2006.01)
*D06C 3/04* (2006.01)

(52) U.S. Cl.
CPC . *F02K 1/72* (2013.01); *D06C 3/04* (2013.01)

(58) Field of Classification Search
CPC .... F02K 1/72; D06C 3/04; D06C 3/10; B63H 9/08
(Continued)

(56) References Cited

U.S. PATENT DOCUMENTS

| 253,528 | A | * | 2/1882 | Haggerty | ................. | B63H 9/08 |
| | | | | | | 114/112 |
| 1,829,413 | A | * | 10/1931 | Kozlay | .................... | B63H 9/08 |
| | | | | | | 114/112 |

(Continued)

FOREIGN PATENT DOCUMENTS

| CN | 118525142 A | * | 8/2024 | ............... F02K 1/72 |
| FR | 3 076 864 A1 | | 7/2019 | |

(Continued)

OTHER PUBLICATIONS

International Search Report mailed on Dec. 13, 2023 in PCT/FR2023/051348 filed on Sep. 8, 2023, 2 pages.

*Primary Examiner* — Lorne E Meade
*Assistant Examiner* — Marc Amar
(74) *Attorney, Agent, or Firm* — Oblon, McClelland, Maier &Neustadt, L.L.P.

(57) ABSTRACT

A thrust reverser including a sealing membrane designed to deflect at least one portion of a secondary flow towards a deflection cascade when a movable structure of the reverser is in the retracted reverse-thrust position, the reverser including a rear frame for supporting the deflection cascade. The reverser further includes an interface device between the sealing membrane and a rear cascade structure including the rear cascade support frame, the vanes located furthest back on the deflection cascade, and a bearing member via which the cascade bears against the rear cascade support frame.

(Continued)

Moreover, the device forms an elastic clip mounted around the rear structure, and a rear clip portion whereof is arranged behind the structure.

10 Claims, 12 Drawing Sheets

(58) Field of Classification Search
 USPC .................................................. 26/93, 94
 See application file for complete search history.

(56) References Cited

U.S. PATENT DOCUMENTS

| | | | | |
|---|---|---|---|---|
| 3,056,182 | A * | 10/1962 | Gary ................. | B60J 10/18 24/561 |
| 3,225,407 | A * | 12/1965 | Daniels ............ | F16B 5/0692 24/457 |
| 3,366,349 | A * | 1/1968 | Rudis ................ | F02K 1/68 60/230 |
| 3,599,432 | A * | 8/1971 | Ellis ................. | F02K 1/645 60/230 |
| 4,858,349 | A * | 8/1989 | Walsh ............... | D06C 3/04 38/102.4 |
| 5,140,718 | A * | 8/1992 | Toth ................. | B63H 9/10 114/221 R |
| 2013/0092755 | A1* | 4/2013 | Aten ................. | F02K 1/72 239/265.33 |
| 2020/0347800 | A1* | 11/2020 | Gonidec ........... | F02K 1/625 |
| 2022/0025832 | A1* | 1/2022 | Thubert ............ | F02K 1/763 |
| 2022/0228541 | A1* | 7/2022 | Porte ................ | F02K 1/62 |
| 2022/0243681 | A1* | 8/2022 | West ................. | F02K 1/72 |

FOREIGN PATENT DOCUMENTS

| | | |
|---|---|---|
| FR | 3 087 848 A1 | 5/2020 |
| WO | WO 2022/167754 A1 | 8/2022 |

* cited by examiner

THRUST REVERSER COMPRISING MEANS FACILITATING THE MOUNTING OF A MEMBRANE FOR SEALING OFF THE SECONDARY FLOW PATH

TECHNICAL FIELD

The invention relates to the field of nacelles and thrust reversers for aircraft propulsion units, and, more particularly, to reversers comprising one or more membranes for sealing off the secondary flow path.

PRIOR ART

Thrust reversers are devices for deflecting the air flow passing through the propulsion unit to the front, so as to shorten landing distances, and limit the load of brakes on landing gears.

The cascade reversers currently used in the aeronautics sector generally comprise deflection cascades integrated in a fixed structure of the reverser, intended to be connected to a turbine engine housing. A movable structure of the reverser includes one or more movable reverser covers, and it is mounted movable in translation with respect to the fixed structure between a forward direct-thrust position, and a retracted reverse-thrust position. In the forward direct-thrust position, the deflection cascades are arranged in a cavity of the movable reverser covers, and they are isolated from the secondary flow path of the propulsion unit by a radially internal wall of the reverser covers. On the other hand, in the retracted reverse-thrust position, the radially internal wall of the reverse covers defines a passage opening of the secondary flow path toward the deflection cascades.

To deflect at least one portion of the secondary flow to this passage opening toward the cascades, the reversers are also equipped with sealing flaps, which, when they are deployed, at least partially seal off the secondary flow path. In a known manner, this forces the air from the secondary flow to pass through the passage opening and reach the cascades, which then generate the forward counter-thrust air flow.

There are also solutions for sealing off the secondary flow path using deployable membranes. Such a membrane design is for example known from document FR 3 076 864 A1.

However, there remains a need to improve the attachment of this sealing membrane on or in the vicinity of the rear of the deflection cascades, so as to provide a reliable fastening, while facilitating installation operations of this membrane on the reverser.

DISCLOSURE OF THE INVENTION

To meet this need, the invention firstly relates to a thrust reverser for an aircraft propulsion unit, the reverser comprising a fixed structure equipped with a radially internal delimiting wall of a secondary flow path of the propulsion unit through which a secondary flow is intended to pass, the reverser also comprising a movable structure comprising at least one reverser cover equipped with a radially external wall and a radially internal wall forming a radially external delimitation of the secondary flow path, the movable structure being movable in translation with respect to the fixed structure along a longitudinal central axis of the reverser, between a forward direct-thrust position and a retracted reverse-thrust position, the reverser also including a deflection cascade and a sealing membrane designed to deflect at least one portion of the secondary flow toward the deflection cascade when the movable structure is in the retracted reverse-thrust position, the reverser also including a rear cascade support frame for supporting the deflection cascade.

According to the invention, the reverser includes an interface device between the sealing membrane and a rear cascade structure comprising the rear cascade support frame, the vanes located furthest back on the deflection cascade, and a bearing member via which the cascade bears against the rear cascade support frame, the bearing member projecting behind the vanes located furthest back and also being fastened to the rear cascade support frame. Furthermore, a first end of the sealing membrane is fastened to the interface device via first coupling means, and finally, the interface device forms an elastic clip mounted around the rear structure, and a rear clip portion whereof is arranged behind the rear structure.

Thanks to the implementation of an elastic clip system formed within the interface device specific to the invention, installation of the membrane on the reverser is advantageously simplified, while providing a reliable and effective fastening. In particular, the membrane is preferably fastened to the interface device outside the reverser, before clipping the unit onto said rear structure of the reverser.

The invention preferably provides at least one of the following optional technical features, taken alone or in combination.

Preferably, the interface device is equipped with anti-rotation means relative to the rear structure, the anti-rotation means being in contact with the rear cascade support frame and/or the bearing member of the deflection cascade.

Preferably, the clip includes a hook bearing against any one of the following elements:
   the rear cascade support frame;
   the vanes located furthest back on the cascade; or
   a clip latch itself bearing against the vanes located furthest back on the cascade.

According to a preferred embodiment of the invention, the hook of the elastic clip is a clamping hook bearing against a front end of the rear cascade support frame, and the elastic clip comprises a rear axial stop bearing against a rear portion of the rear structure, preferably against a rear end of the rear cascade support frame, the clamping hook forcing the rear axial stop forward against the rear portion of the rear structure.

Preferably, the elastic clip includes, between the clamping hook and the rear axial stop, flexible means making it possible, when they are moved to a predefined stress state, to disengage the hook from the rear cascade support frame, the flexible means preferably comprising an axial tab.

Preferably, the elastic clip also includes, preferably at the end of the clamping hook, gripping means making it possible, under stress, to move the flexible means to said predefined stress state.

Preferably, the flexible means and the clamping hook are integral with the rest of the interface device, or mounted therein.

Preferably, at least one portion of the first membrane coupling means is located in front of a rear end of the rear structure. This makes it possible to enhance the performance of the reverser, the air flow extracted from the secondary flow path being channeled better toward the deflection cascade(s).

Preferably, the interface device extends over an angular range greater than 10°, while being centered on the longitudinal central axis of the reverser.

Preferably, the deflection cascade belongs to the fixed structure of the reverser.

However, a movable cascade configuration remains possible, without leaving the scope of the invention.

The invention also relates to an aircraft propulsion unit, comprising a turbine engine and a nacelle including at least one fan cover, and a thrust reverser as described above.

The invention also relates to a method for installing a sealing membrane of a thrust reverser as described above, comprising the following two steps, carried out in any order:

fastening the first end of the sealing membrane on the interface device, via the first coupling means, this fastening step being preferably carried out outside the reverser;

moving the movable structure of the reverser to its retracted reverse-thrust position;

from outside the reverser, clipping the interface device onto the rear structure, and pushing the sealing membrane into the secondary flow path.

Further advantages and features of the invention will emerge in the non-limiting detailed description hereinafter.

BRIEF DESCRIPTION OF THE DRAWINGS

The following detailed description refers to the appended drawings wherein.

DESCRIPTION OF THE EMBODIMENTS

Figure 1:
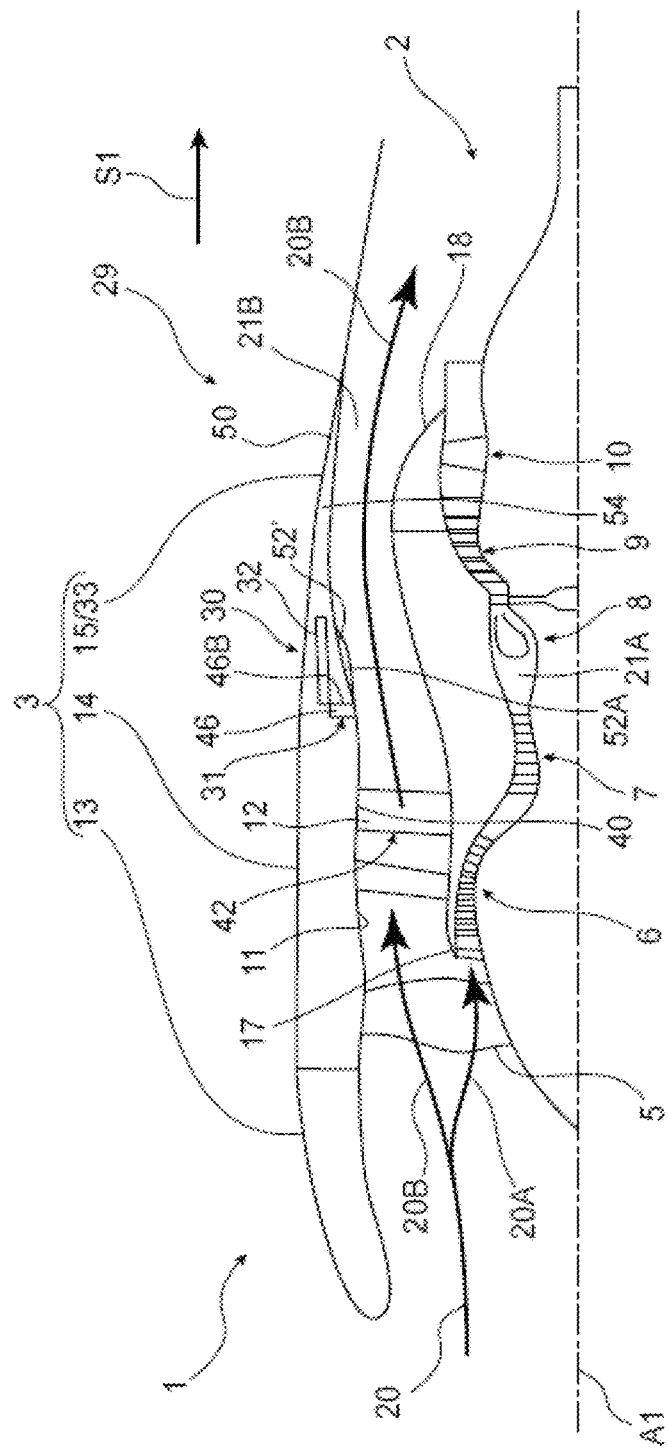
FIG. 1 is a schematic longitudinal sectional half-view of a propulsion unit, comprising a thrust reverser according to a preferred embodiment of the invention, represented in the direct-thrust configuration.

FIG. 1 shows a propulsion unit 1, having a longitudinal central axis A1.

Subsequently, the terms "upstream" and "downstream" are defined relative to a general direction S1 of flow of gases through the propulsion unit 1, along the axis A1 when it generates a thrust. These terms "upstream" and "downstream" may be respectively replaced by the terms "front" and "rear", with the same meaning.

The propulsion unit 1 comprises a turbine engine 2, a nacelle 3 and a mast (not shown), intended to connect the propulsion unit 1 to a wing (not shown) of the aircraft.

The turbine engine 2 is in this example a bypass twin-spool turbojet comprising, from the front to the rear, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator. The turbojet 2 is equipped with a fan housing 11 connected to the gas generator by structural arms 12.

The nacelle 3 comprises a front section forming an air inlet 13, a middle section which includes two fan covers 14 covering the fan housing 11, and a rear section 15.

In operation, an air flow 20 enters the propulsion unit 1 via the air inlet 13, passes through the fan 5 and then splits into a primary flow 20A and a secondary flow 20B. The primary flow 20A flows in a primary gas flow path 21A passing through the gas generator. The secondary flow 20B flows in a secondary flow path 21B surrounding the gas generator. The secondary flow path 21B is delimited radially inward by a fixed inner fairing which surrounds the gas generator. In this example, the fixed internal fairing comprises a first segment 17 belonging to the middle section 14, and a second segment 18 extending to the rear from the first segment 17, so as to form a portion of the rear section 15. This second segment 18 is an integral part of a fixed structure of a thrust reverser which will be described hereinafter. This segment will hereinafter be referred to as radially internal delimiting wall 18 of the secondary flow path 21B.

Radially outward, the secondary flow path 21B is delimited by the fan casing 11, and, in the configuration of FIG. 1, by one or more movable reverser covers 33 forming a portion of the rear section 15 of the nacelle 3, and which will be described subsequently. More specifically, between the fan housing 11 and the reverser covers 33, an outer shroud 40 of an intermediate housing 42 is provided, the latter comprising the structural arms 12 mentioned above, the radially external end whereof is fastened onto this shroud 40. This therefore helps delimit the secondary flow path 21B radially outward, while being located in the downstream axial extension of the fan housing 11.

The nacelle 3 therefore includes a thrust reverser 30 centered on the axis A1 and comprising, on one hand, a fixed structure 31 rigidly connected to the fan housing 11, and, on the other, a movable structure 29 relative to the fixed structure 31. The fixed structure 31 includes for example a front frame 46 which connects it fixedly to the fan housing 11, preferably via a knife clamp assembly located downstream from the outer shroud 11. This front frame 46 contains a profiled aerodynamic portion referred to as deflection edge 46B, which guides the reverse jet flow.

Here, the fixed structure 31 also includes a plurality of deflection cascades 32 arranged adjacently to each other about the axis A1, along a circumferential direction of the reverser 30 and the propulsion unit 1. Moreover, the movable structure 29 comprises for its part the movable reverser covers 33 mentioned above, for example two covers 33 each extending over an angular amplitude of approximately 180°. This configuration with two covers 33 is particular suitable in the case of a nacelle design wherein the covers/walls 18 are also mounted articulated, the reverser 30 then having a so-called "D-Duct" architecture. In this architecture, the covers 18, 33 are connected so as to open/close simultaneously during maintenance operations on the engine. Nevertheless, other architectures are possible, such as for example a so-called "C-Duct" architecture, or a so-called "O-Duct" architecture.

Each reverser cover 33 includes a radially external wall 50 forming an external aerodynamic nacelle surface, and a radially internal wall 52 helping delimit the secondary flow path 21B radially outward. This wall 52 is located in the downstream continuity of the deflection edge 46B. The two walls 50, 52 define a cavity 54 axially open at the upstream end of the reverser cover 33.

FIG. 1 shows the reverser 30 in a forward thrust, so-called "direct-jet", configuration, corresponding to a standard flight configuration. In this configuration, the covers 33 of the movable structure 29 are in a closing position, referred to as forward-thrust or "direct-jet" position, wherein these reverser covers 33 bear against the fixed structure 31, in particular against the deflection edge 46B forming an integral part thereof. Indeed, in the direct-thrust configuration, the upstream end 52a of the radially internal wall 52 of each cover 33 bears axially against the deflection edge 46B.

The movable cover 33 is held in the forward direct-thrust position by means for locking this cover on the fixed structure 31 of the reverser. These controlled locking means (not shown) are conventional, therefore they will not be described further.

The movable structure 29 is thus movable in translation relative to the fixed structure 31 along the axis A1 of the reverser, between the forward direct-thrust position shown in FIG. 1, and a retracted reverse-thrust position which will be described subsequently. In the forward direct-thrust position of the movable structure 29, the deflection cascades 32 are arranged in the cavity 54 of the reverser covers 33, while being isolated from the secondary flow path 21B by the radially internal wall 52 of these sliding reverser covers 29. This wall 52, forming the external wall of the secondary flow path, is also referred to as internal acoustic panel.

Figure 2:
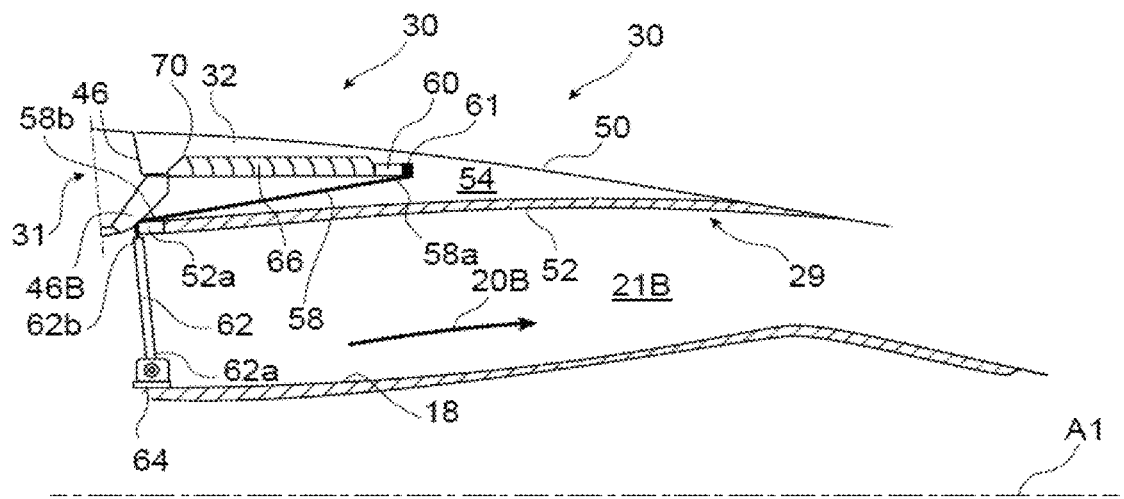
FIG. 2 is a schematic longitudinal half-view of the reverser equipping the propulsion unit shown in FIG. 1, with the reverser represented in the direct-thrust configuration.
Figure 3:
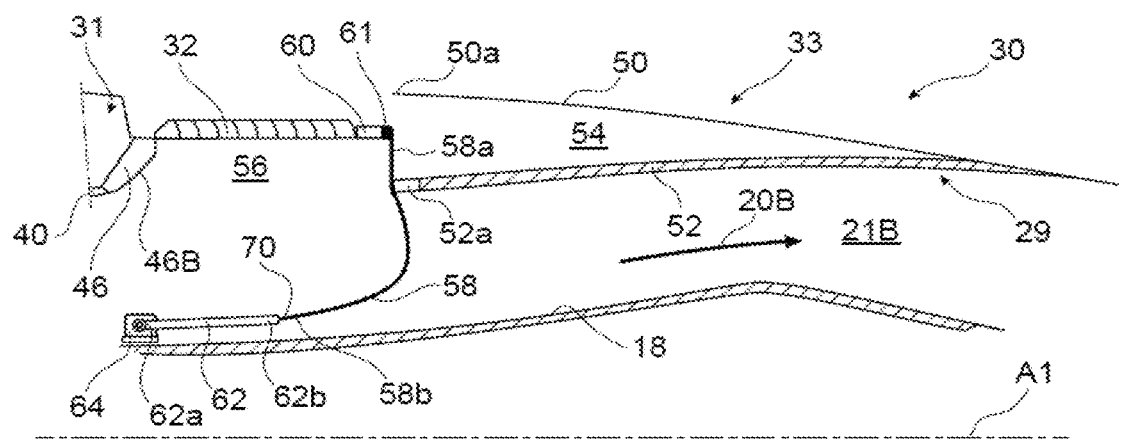
FIG. 3 is a schematic half-view of the reverser shown in FIG. 2, represented in the reverse-thrust configuration.
Figure 4:
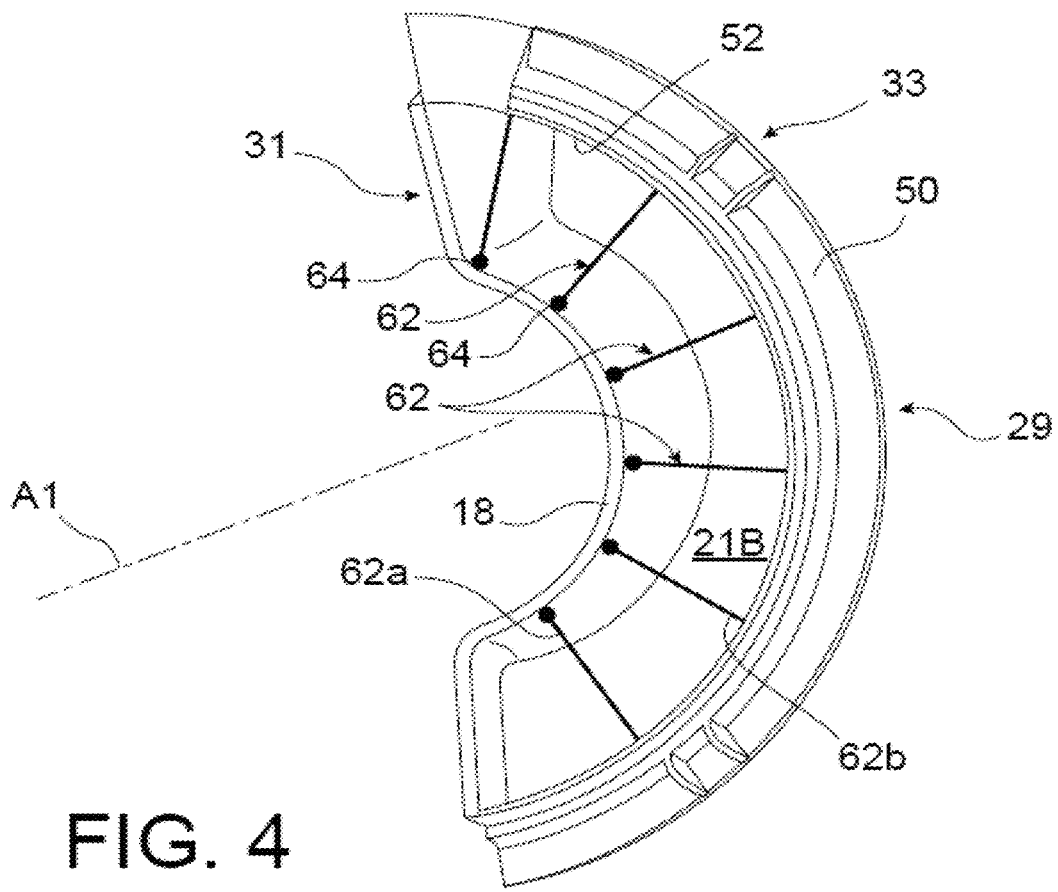
FIG. 4 is a perspective view of the reverser shown in FIGS. 2 and 3, represented in the direct-thrust configuration.
Figure 5:
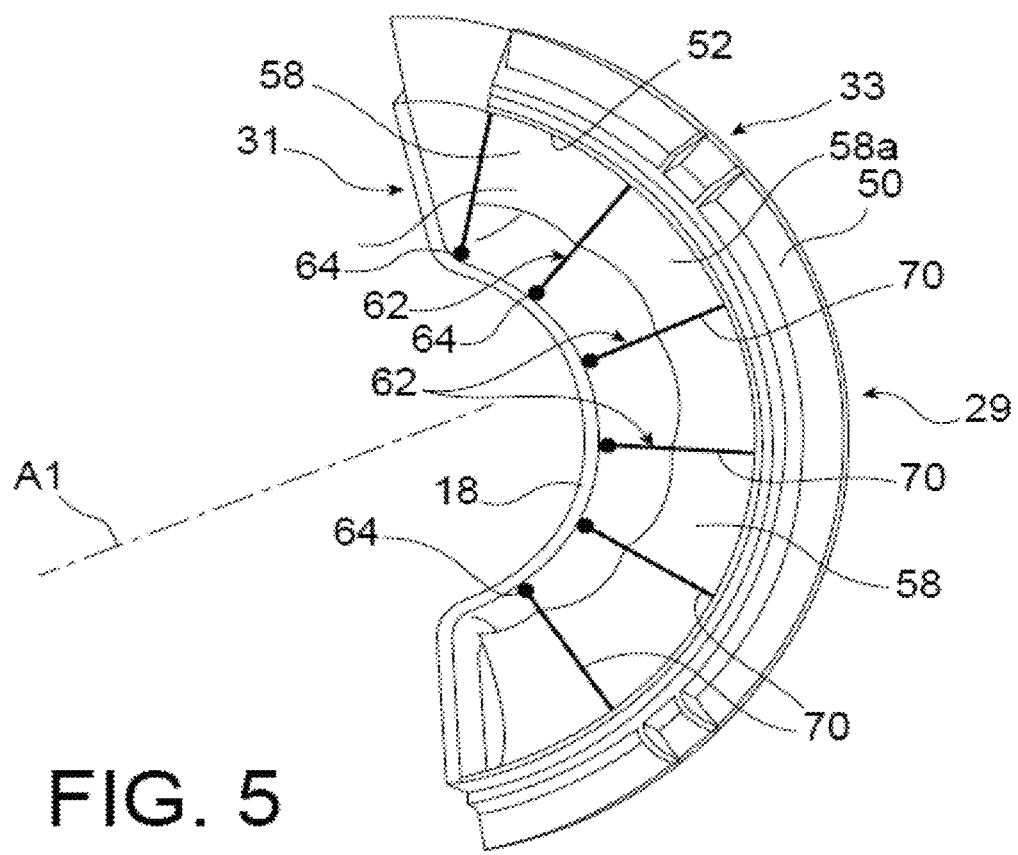
FIG. 5 is a perspective view of the reverser shown in FIG. 4, represented in the reverse-thrust configuration.

This direct-thrust configuration is also shown in FIGS. 2 and 4, whereas the retracted reverse-thrust position of the movable structure 29 is shown in FIGS. 3 and 5. In FIG. 3, it is shown that the retracted internal acoustic panel 52 of the reverser covers reveals upstream a passage opening 56 of the secondary flow path 21B toward the deflection cascades 32. The opening 56 is therefore also delimited upstream by the deflection edge 46B, which flares radially outward to the rear, to channel an air flow intended to pass through the cascades 32 when the movable solution is in this retracted reverse-thrust position. In other words, the deflection edge 46B moves progressively away from the axis A1 from front to rear, to guide/deflect the air toward the cascades 32 in the reverse-thrust configuration. Downstream, the passage opening 56 is delimited in particular by the upstream end 52a of the radially internal wall 52.

In order to deflect at least one portion of the secondary flow 20B toward the passage opening 56 defined axially between the deflection edge 46B and the upstream edge 52a of the radially internal wall 52 of each cover 33, the reverser 30 includes in this preferred embodiment one or more sealing membranes 58. Preferably, several circumferentially adjacent membranes are associated with each cover 33.

Each membrane 58 can be made of a material known to a person skilled in the art for this type of application. For example, it can consist of a non-impregnated fabric, for example aramid fibers. The membrane 58 can also be made using a composite material, the matrix whereof is particularly flexible, for example of aliphatic polyurethane, which allows use under different temperature conditions, in particular lower temperatures in the case of an aliphatic polyurethane membrane than in the case of a silicone membrane. The matrix gives a low flexural regain capacity and the behavior of the structure obtained is indeed that of a membrane. One of the major properties of this membrane 58 is that of being able to fold perfectly reversibly (elastic or by fiber slippage) with a very small radius of curvature relative to its surface area, and of having a very thin thickness, for example of the order of 0.1 to 3 mm. As an indication, it is observed that this membrane 58 acts like a boat sail or a parachute/a sailwing when it is pressurized.

Again with reference to FIGS. 1 to 5, first coupling means are provided connecting a first end 58a of the sealing membrane 58 to a rear cascade support frame 60 for supporting the cascades 32, via an interface device 61 as will be disclosed in detail subsequently. The rear cascade support frame 60 is an annular or annular segment-shaped support, effectively connecting the rear end of several adjacent cascades. Furthermore, second coupling means connect a second end 58b of the sealing membrane 58, opposite the first membrane 58a, to the wall 18.

Furthermore, as seen in FIGS. 1, 2 and 4, when the movable structure 29 occupies its forward direct-thrust position, at least one portion of the sealing membrane 58 is arranged radially between the deflection cascades 32 and the radially internal wall 52 of the reverser cover 33, in the cavity 54. Preferably, the portion of the membrane 58 which is located in this cavity 54 of the reverser cover 33 radially covers the entire length of the cascades 32. Hence, when the movable structure 29 adopts its forward direct-thrust position, the second end 58b of the membrane 58 is gripped between the upstream end of the wall 18, and the deflection edge 46B. In order to avoid any damage of the membrane 58 on account of this gripping, the deflection edge 46B can locally have an indentation of an adapted shape to receive the upstream end 52a of the wall 52. Thus, the membrane 58 is also pressed into this indentation of the deflection edge 46B, by the bearing of the upstream end of the wall 52.

Likewise, as seen in FIG. 3, when the movable structure 29 moves and it occupies its retracted reverse-thrust position at the end of this movement, the sealing membrane 58 is partially bearing against the upstream end 52a of the radially internal wall 52 of the reverser cover, therefore corresponding to the acoustic panel. More specifically, during the movement to the rear of the movable structure 29, the membrane 58 slides along this upstream end 52a of the radially internal wall 52.

Figure 3A:
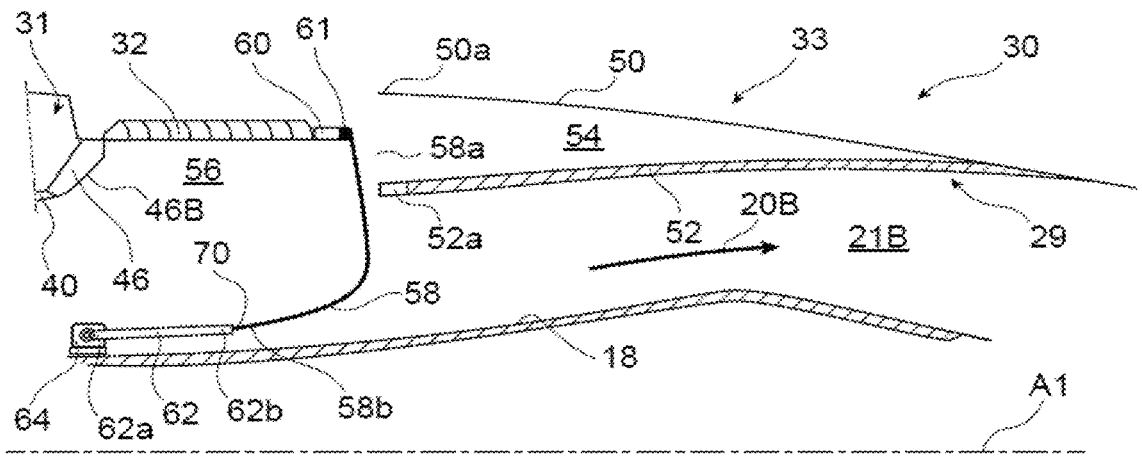
FIG. 3A is a schematic half-view similar to that of the preceding figure, with the reverser shown according to an alternative embodiment.

In the retracted reverse-thrust position of FIG. 3, the membrane 58 therefore axially bears in the downstream direction against the upstream end 52a. It should be noted that according to the range of the axial travel of the reverser, the membrane 58 may no longer be in contact with the internal acoustic panel 52 in the fully deployed position of the reverser, where the cover 33 is in the position located furthest back. Such a configuration is shown in FIG. 3A, wherein it is shown that the membrane 58 is located upstream and at a distance from the upstream end 52a of the wall 52 of the reverser cover. The option with contact corresponds to a minimized reverse travel, whereas the option without contact generally corresponds to a smoother reverse-jet, therefore more aerodynamically effective, membrane shape.

Thus, the portion of the membrane 58 which is located radially outward relative to its bearing zone on the wall 52 seals off a portion of the upstream axial opening of the cavity 54, whereas the other portion located radially inward seals off at least one portion of the secondary flow path 21B, in this way deflecting at least one portion of the secondary flow 20B to the passage opening 56 toward the cascades 32.

The end 58b of the membrane 58 has for its part cables 70 connected to the wall 18 (also known as IFS, standing for "Inner Fixed Structure"), by a connection which can advantageously exert a tensile force on each cable 70 returning it to this wall 18, for example by means an elastic connection. The cables 70 themselves can be elastic, for example using Kevlar cables, and said cables can be tensioned when closing the sliding cover 33. Reinforcements can be integrated in the membrane 58 extending from these cables 70, to the external coupling points with the rear cascade support frame 60, or the external wall 50 of the sliding cover 33.

These cables 70 are advantageously positioned radially in the flow path spaced circumferentially apart from each other. In the direct-jet position, they stretch the membrane 58 between its end 58a and the leading edge/the upstream end 52a of the wall 52 of the cover. During deployment, when the sliding cover 33 retracts, the cables 70 pull the membrane 58 toward the secondary flow path such that it takes air therein and is progressively deployed.

According to the sought aim, the second coupling means can consist of connecting rods 62, instead of the cables mentioned above. A first end 62a of each of them is mounted on the wall 18, preferably via a pin or ball and socket joint 64. This joint 64 can be embodied using a fitting fastened onto the fixed wall 18 and cooperating with the first connecting rod end 62a.

The connecting rods 62 are spaced circumferentially apart from each other within the secondary flow path 21B, and their number can for example vary from two to ten.

Each connecting rod 62 is designed to move from a position radially projecting into the second flow path 21B, the position shown in FIGS. 2 and 4 adopted when the movable structure 29 occupies its forward direct-thrust position, to a position folded back in the downstream direction, shown in FIGS. 3 and 5 adopted when the movable structure 29 occupies its retracted reverse-thrust position.

Elastic return means can be provided to tend to incline each connecting rod 62 to its folded back/reclined position of FIG. 3, in particular when the connecting rod is in its projecting position corresponding to the flight position of the reverser.

The second end 62b of each connecting rod 62, opposite the first end 62a, can be connected directly to the second end 58b of the membrane 58. Nevertheless, other preferential solutions are retained, such as those aimed at integrating reinforcing cables or straps within the second coupling means.

In the embodiments shown in FIGS. 1 to 5, the cables 70 cooperate with the connecting rods 62 while being each fastened to the second end 62b of one of the connecting rods associated with this cable. Alternatively, the cables 70 may pass through their associated connecting rods 62 to be fastened to the radially internal delimiting wall 52 of the secondary flow path, for example via the fittings 66.

With reference to FIGS. 6 to 9 representing a preferred embodiment of the invention, one of the specificities of the invention lies in the implementation of the interface device 61 between the first end 58a of the sealing membrane 58, and a rear cascade structure 72 which will now be described.

This rear structure 72 comprises the rear cascade support frame 60, and the vanes 32a located furthest back on the deflection cascade 32. It also includes a bearing member 74 via which the cascade bears against the rear cascade support frame 60, the bearing member projecting behind the vanes 32a located furthest back within the cascade. Here, the bearing member 74 extends axially or substantially axially, and it is also fastened to the rear cascade support frame 60 using bolts 76 spaced apart from each other along a circumferential direction 78. The bearing member 74 is preferably located radially inward relative to the rear cascade support frame 60, even though a reverse scenario may be retained, without leaving the scope of the invention.

The structure 72 therefore forms an integral unit, comprising the rear of the cascade 32 and extending to the rear thereof. This structure is intended to receive the interface device 61, the specificity whereof lies in being mounted by an elastic clip clamping this structure 72, as will be described hereinafter.

It is noted that in this preferred embodiment, the interface device 61 extends over an angular range greater than 10°, relative to the longitudinal central axis A1 of the reverser. Moreover, it is also preferably provided that the membrane 58 have the same angular range, and that such a membrane 58 be associated with each interface device 61 extending along the circumferential direction 78. Indeed, several interface devices 61 are provided to follow each other along the direction 78, for example being placed end-to-end to recreate a sector close to 360°, or slightly less than 360°. Therefore, a plurality of interface devices 61 cooperate with the same annular rear cascade support frame 60.

Figure 6:
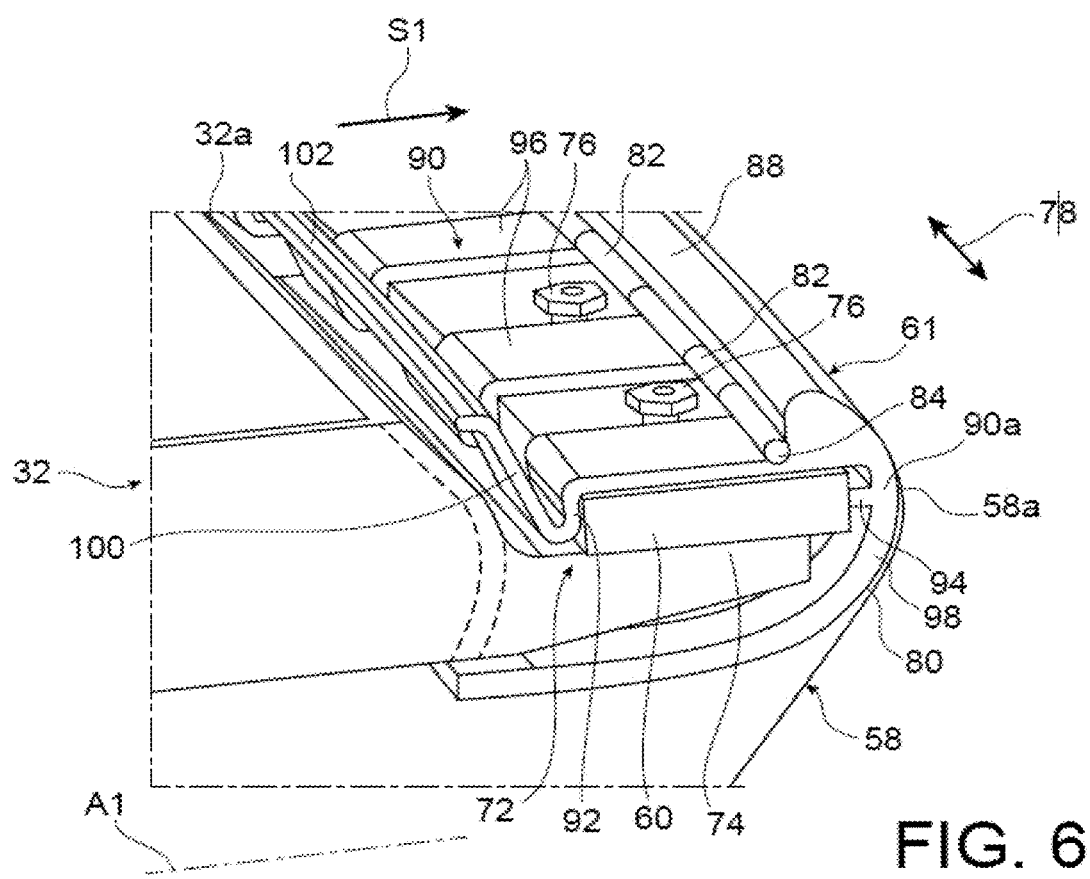
FIG. 6 is a more detailed perspective view of a portion of the reverser, according to a preferred embodiment of the invention.
Figure 7:
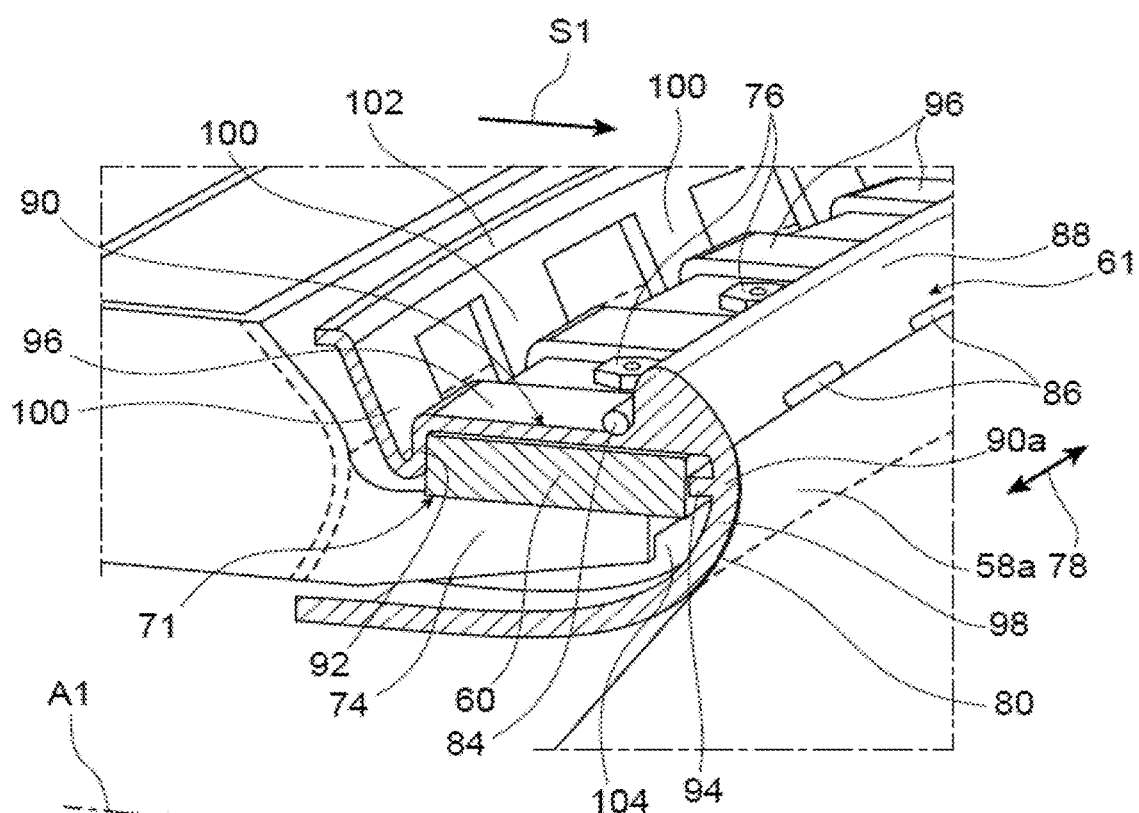
FIG. 7 is a perspective view similar to that of FIG. 6, according to another viewing angle.

Firstly, it is noted that the interface device 61 has, at the rear, a curved surface 80 against which the membrane 58 will bear in the deployed configuration shown in FIGS. 6 and 7. The first end 58a of the sealing membrane 58 is fastened to this interface device 61 via the first coupling means. These are formed by textile loops 82 which pass through slots 86 formed in the interface device 61, and which open onto the curved surface 80. A trim strip 84 or similar element, which extends circumferentially, passes through each of the loops 82. It finds itself moreover axially bearing against a protuberance 88 of the interface device, which allows the axial holding of the loops 82 and of the whole first end 58a of the membrane 58. As seen in FIGS. 6 and 7, the protuberance 88 extends in particular radially outward, with the membrane 58 preferably exerting an inward tensile force. The trim strip 84 and the protuberance 88 thus cooperate together so as to ensure an axial hold of the first end 58a of the sealing membrane 58, through which said trim strip passes.

Other types of first coupling means can nonetheless be implemented, such as clip button, loop and hook, or bolt-rope solutions.

For the mounting of the interface device 61 on the structure 72, this device 61 forms an elastic clip 90 mounted about the structure 72. This clip 90 firstly includes a clamping hook 92 axially bearing against a front end of the rear support frame 60. Furthermore, the clip comprises a rear axial stop 94 bearing against a rear end of said rear cascade support frame 60. This stop 94 is located on a rear portion 90a of the clip, which bypasses the structure 72 from behind.

Thus, because the elastic clip 90 axially grips the rear cascade support frame 60, its clamping hook 92 forces the rear axial stop 94 forward against the rear portion of the rear structure, and more specifically here the rear end of the rear cascade support frame 60. The rear clip portion formed by the rear axial stop 94 is therefore arranged behind the structure 72, bypassing the frame 60 and the whole structure 72 from behind. From this axial stop 94, the interface device 61 includes an inner edge 98 which defines a portion of the surface 80, and which curves progressively to be oriented axially in the upstream direction, radially under the bearing member 74 and the rear cascade support frame 60.

Figure 7A:
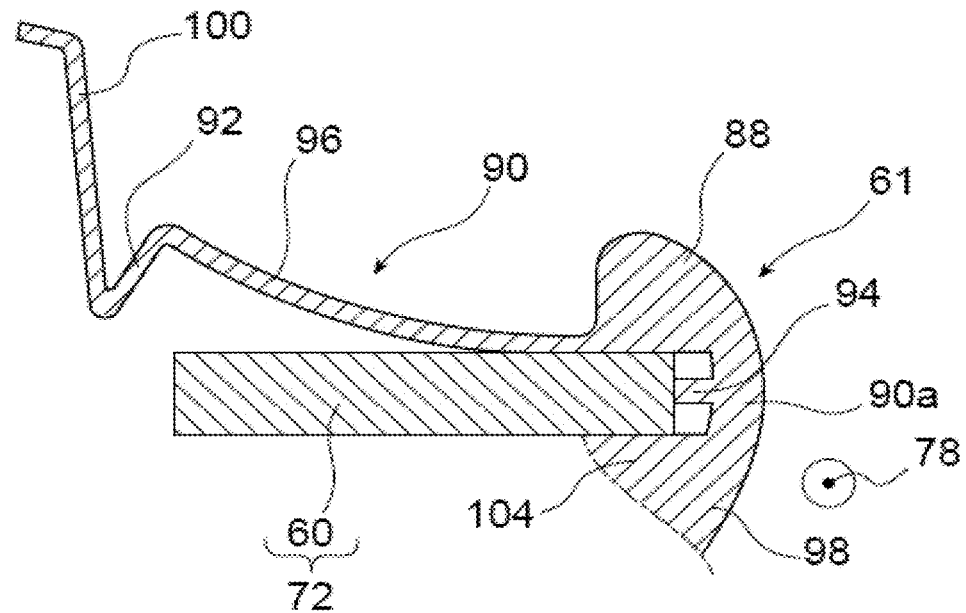
FIG. 7A is a sectional view of the reverser portion shown in FIGS. 6 and 7, with the clip open.

Between the clamping hook 92 and the rear axial stop 94, the clip 90 includes flexible means, such as one or more axial tabs 96 extending in the upstream direction from the protuberance 88 in the form of a lip or bead. The flexible tabs 96 are in contact with a radially external surface of the rear cascade support frame 60. They are designed to be moved to a predefined flexural stress state, wherein they make it possible to disengage the clamping hook 92 from the rear cascade support frame 60. This predefined stress state has been represented schematically in FIG. 7A. Therefore, it corresponds to a state wherein the elastic clip 90 is considered to be "open".

To arrive at this open state wherein the tabs 96, spaced circumferentially apart from each other, are bending, the clip 90 also includes at the end of the clamping hook 92, a gripping lug 100. By acting upon this gripping lug 100, which acts as a lever, using a suitable tool, it is possible to stress the flexible tabs 96 into said predefined stress state.

By way of indication, it is noted that within the interface device 61, a clamping hook 92 is associated with each tab 96, between them, they define spaces wherein the bolts 76 are placed. Similarly, at the end of each hook 92, a gripping hook 100 extending radially outward and in the upstream direction is associated. The device 61 thus comprises several gripping lugs 100 spaced circumferentially apart from each other, and which can be connected together by a linking member 102, at their radially external end. This linking member preferably extends along the entire length of the device 61 along the circumferential direction 78.

To consolidate the hold of the interface device 61 on the structure 72, the device 61 also includes anti-rotation means relative to the structure 72, and linked with the circumferential direction. These anti-rotation means are ribs 104 or similar elements, in contact with a radially internal surface of the rear cascade support frame 60 and/or the bearing member 74. These ribs 104 are spaced circumferentially apart from each other, and they are borne by the inner edge 98, extending radially outward from the latter.

The ribs 104 therefore act upon the structure 72 along an opposite direction to that of the force exerted by the tabs 96 on the support frame 60, thus preventing the rotation of the interface device 61 about the circumferential direction.

Figure 7B:
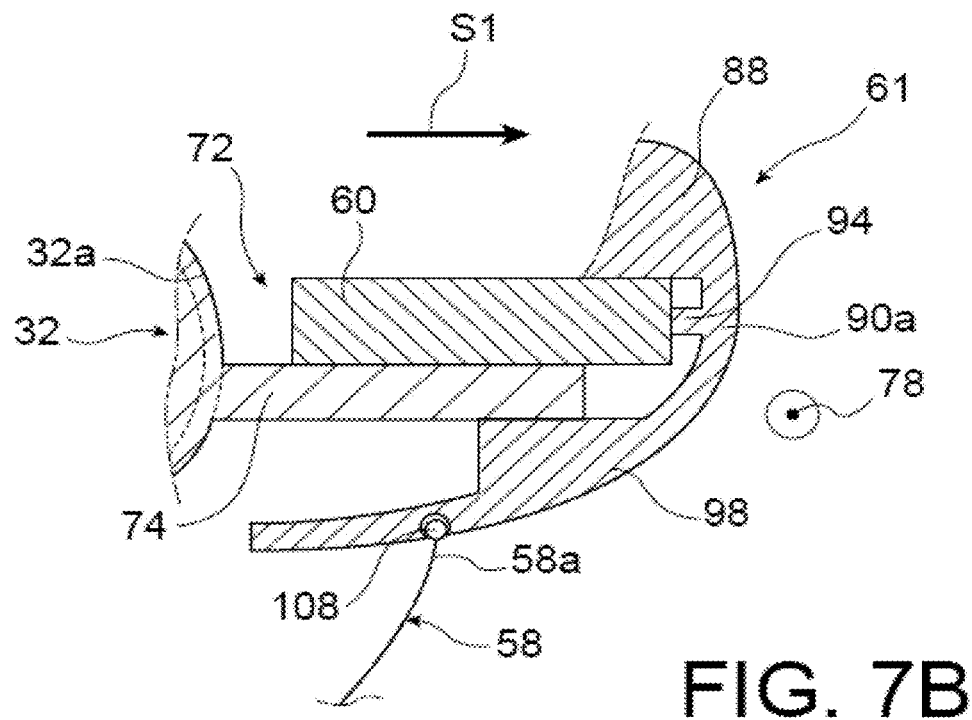
FIG. 7B is a sectional view of a reverser portion similar to that shown in FIGS. 6 to 7A, with the first coupling means of the sealing membrane shown according to an alternative.
Figure 8:
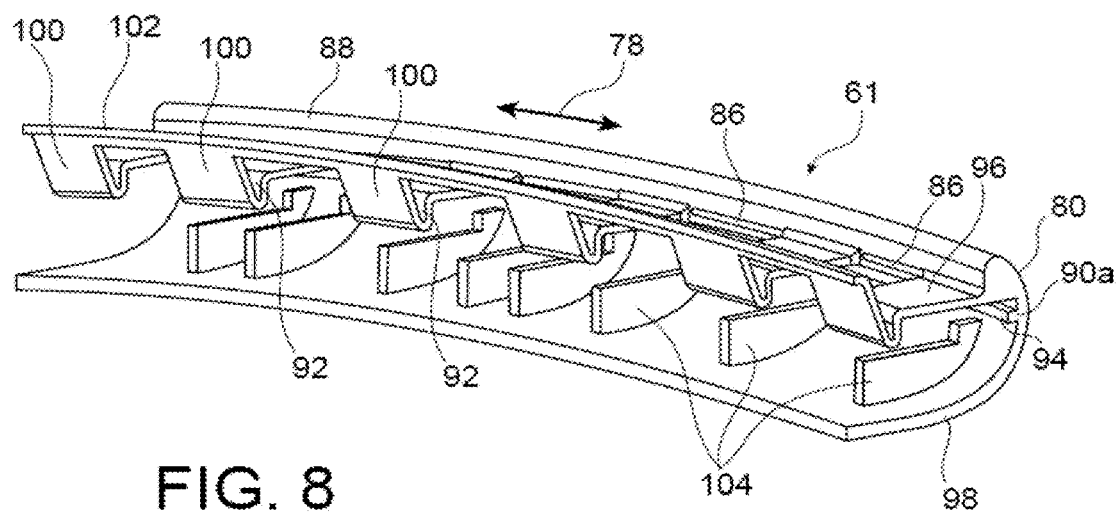
FIG. 8 is a perspective view of the interface device shown in the reverser portion of FIGS. 6 to 7A.
Figure 9:
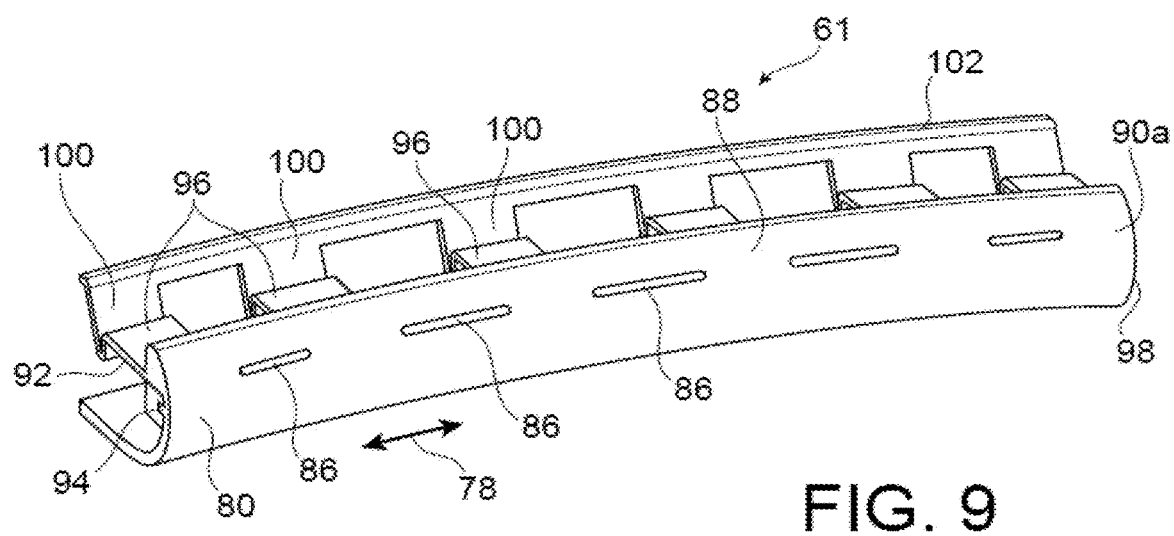
FIG. 9 is a perspective view similar to that of FIG. 8, according to another viewing angle.

In the figures described above, the first coupling means 82, 84, 86 of the membrane 58 are located at a radially external portion of the interface device 61, on the protuberance 88. Nevertheless, other options are available, such as that aimed at placing at least one portion of these first coupling means in front of a rear end of the structure 72. In the alternative example shown in FIG. 7B, the first coupling means comprise a bolt rope 108 which is located in front of the rear end of the frame 60 and that of the bearing member 74, therefore closer to the last vanes 32a of the cascade. This allows the air extracted from the secondary flow path to be channeled better by the membrane 58 toward the cascade 32, for an increased reverse performance. This principle can be applied so as approach, along the axial direction, the first coupling means as close as possible to the last vanes of the cascade 32a.

Thanks to this design specific to the invention, the installation of the sealing membrane 58 on the reverser is facilitated. Indeed, the fastening of the first end 58a of the membrane 58 onto the interface device 61 can first of all be carried out, using the loops 82 and the trim strip 84, and any other means deemed to be suitable for forming the coupling means. This fastening step can advantageously be carried out outside the reverser, on the ground, in parallel with the manufacture/assembly of other components of the reverser/propulsion unit.

When the movable structure 29 of the reverser has been placed in its retracted reverse-thrust position, the interface device 61 can be clipped onto the rear cascade support frame 60 from outside the reverser, i.e., with the operator acting radially from outside this reverser. For the installation of the clip 90, the operator acts with a suitable tool upon the gripping lugs 100 and/or upon the linking member 102 connecting them, in order to create a lever action and trigger the bending of the tabs 96.

Then, the sealing membrane 58 simply needs to be pushed radially inward into the secondary flow path 21B, in order to hook its second end 58b onto the wall 18, as seen in particular in FIG. 3.

The method for uninstalling the membrane 58 is implemented by reversing the steps mentioned above.

In this preferred embodiment of the invention, the tabs 96, the clamping hooks 92 and the remainder of the interface device 61 are preferably integral, i.e., made of one piece, for example metallic.

Figure 10:
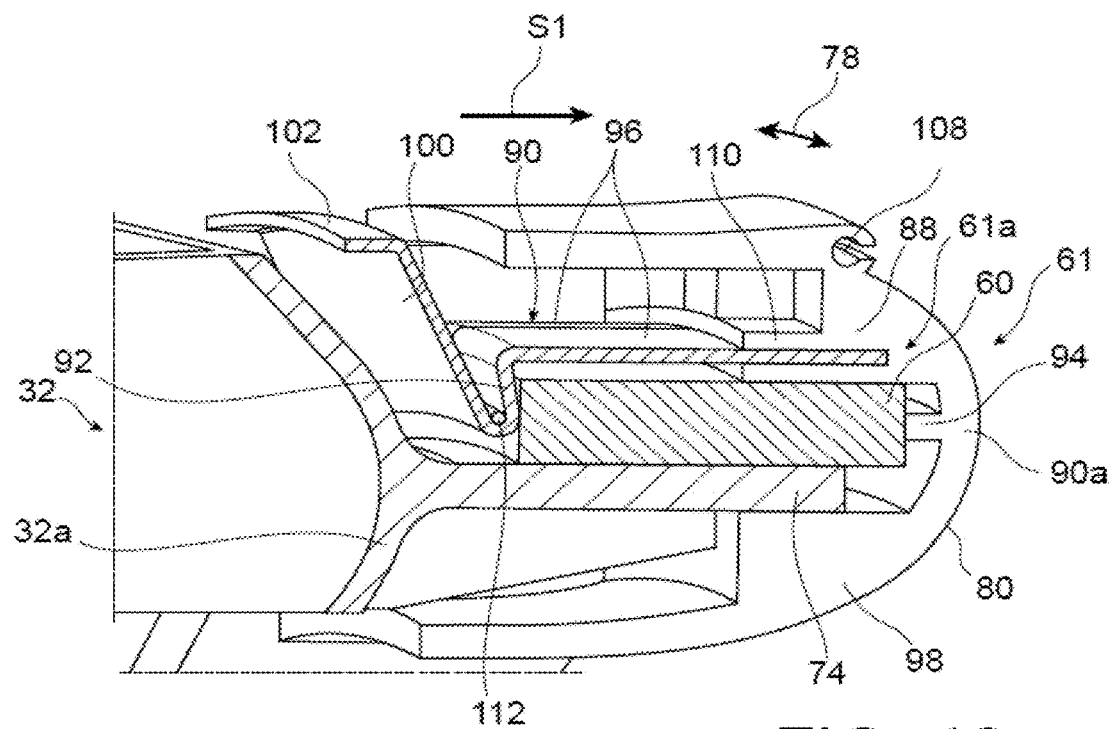
FIG. 10 is a perspective view similar to that of FIG. 6, with the reverser portion shown according to an alternative.
Figure 11:
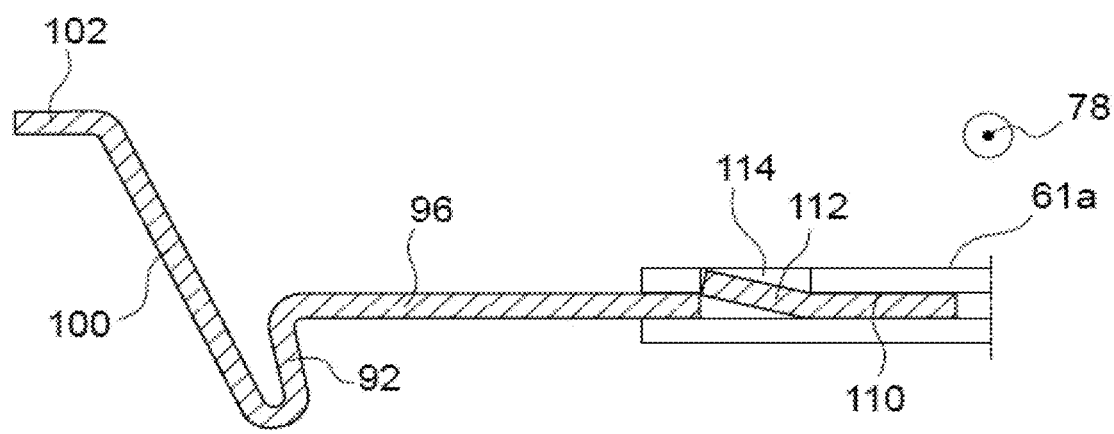
FIG. 11 is a sectional view of the reverser portion shown in the preceding figure.

According to an alternative shown in FIGS. 10 and 11, the flexible tabs 96, the clamping hooks 92, the gripping lugs 100 and the linking member 102 are integral, in one piece mounted on a body 61a of the interface device 61, which can also be made of one piece. This design facilitates the replacement of the tabs or the hooks, in the event of their damage. For the mechanical connection between these two parts, the body 61a can comprise a slot 110 open axially in the upstream direction and wherein the tabs 96 are inserted. The axial locking can be carried out by an elastic tappet 112 on each tab 96, which is inserted into a window 114 opening into the slot 110 so as to generate axial locking in the upstream direction of these tabs. To unlock this axial locking, it is simply needed to bear radially on the elastic tappets 112, using a suitable tool via the windows 114.

In this alternative, a clasp 112 offers a safety device to hold the clip 90 in the closed clamping position, this clasp cooperating with the body 61a, and being inserted in the hollow defined at the link between each hook 92 and its associated gripping lug 100.

Figure 12:
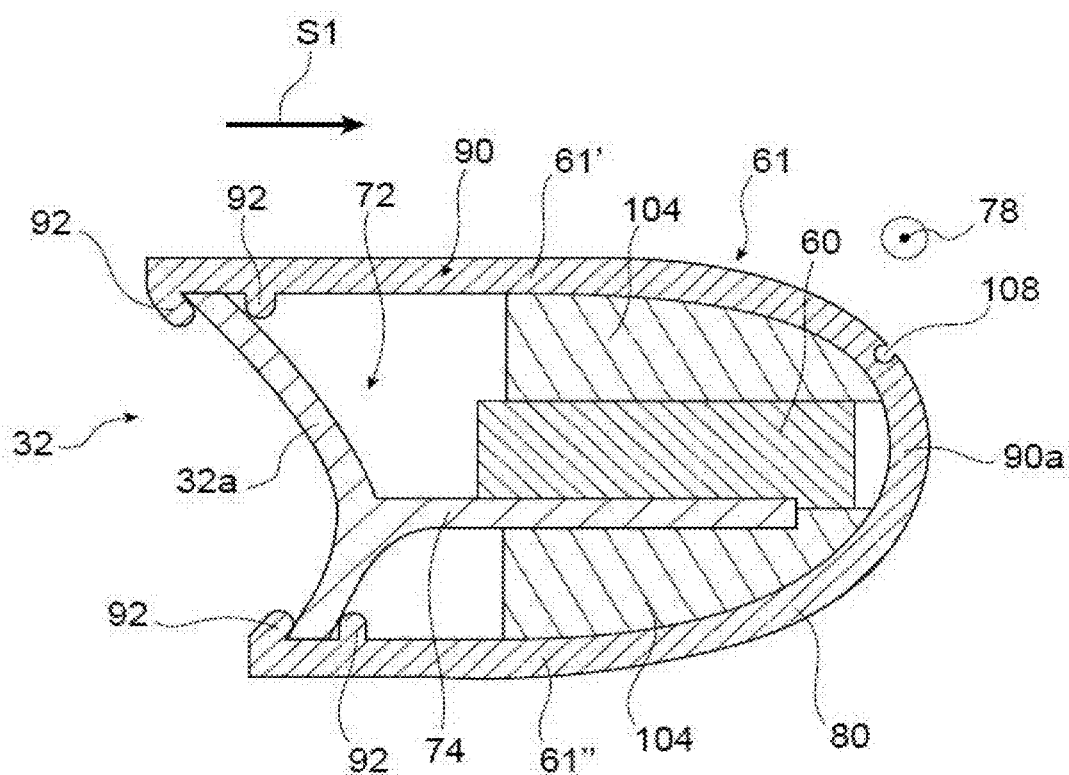
FIG. 12 is a schematic sectional view showing a reverser portion according to another preferred embodiment of the invention.

In another preferred embodiment shown in FIG. 12, the entire interface device 61 forms a C-shaped elastic clip, open axially in the upstream direction. Generally, this device 61 comprises two C arms, one radially external arm 61' and one radially internal arm 61", each equipped with anti-rotation ribs 104 bearing radially against the structure 72, identically or similarly to that disclosed in the previous embodiment.

At the downstream junction between the two arms 61', 61", the rear portion 90a of the clip 90 is arranged behind the structure 72, bypassing the rear end of the frame 60 and that of the bearing member 74 from behind.

At the front end of each of the two arms 61', 61", the clip comprises hooks 92 for axially gripping, on one hand, the radially external end of the last vanes 32*a*, and, on the other, the radially internal end of these last vanes 32*a*. A rear axial stop against the structure 72 can be provided on the elastic clip 90, but it is not necessary.

The separation/deformation of the arms 61, 61" of the overall C-shaped clip makes it possible to insert the hooks 92 on either side of the radial ends of the last vanes 32*a* of the cascade, with which the clip 90 therefore cooperates directly.

In this preferred embodiment, the first coupling means 104 of the membrane can be provided on the radially external arm 61', or on the radially internal arm 61".

Figure 13:
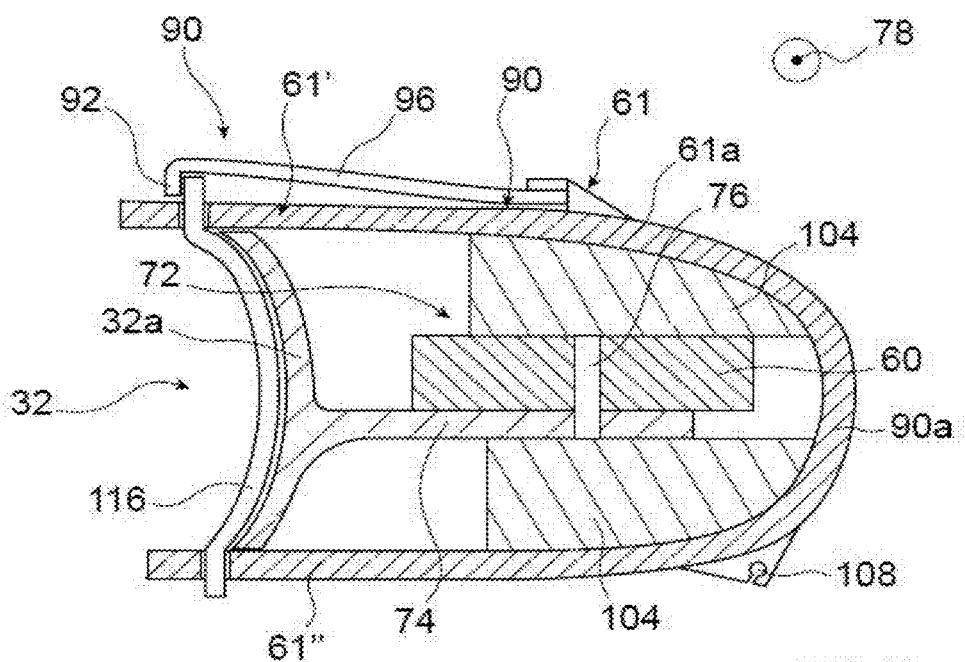
FIG. 13 is a schematic sectional view showing a reverser portion according to a further preferred embodiment of the invention.

According to another preferred embodiment shown in FIG. 13, the interface device includes a C-shaped main body 61*a* open axially in the upstream direction, and equipped with anti-rotation ribs 104.

A clip 90 is mounted thereon on its radially external arm 61', with a rear end integral with this arm, and a hook-shaped front end 92, these two ends being connected by a flexible tab 96.

The hook 92 cooperates with a clip latch 116 which bears axially against the last vanes 32*a*, being arranged upstream from the latter. The two opposite radial ends of the latch 116 pass respectively through the two C arms 61', 61", and the hook 92 cooperates with the external radial end of the latch which is projecting from the arm 61'. More specifically, the hook 92 forces the external radial end of the latch 116 axially to the rear.

A rear axial stop against the structure 72 can be provided on the elastic clip 90, for example at the rear portion 90*a* of this clip, but such a stop is not necessary.

Here, each latch 116 can extend circumferentially all along the interface device 61.

Figure 14:
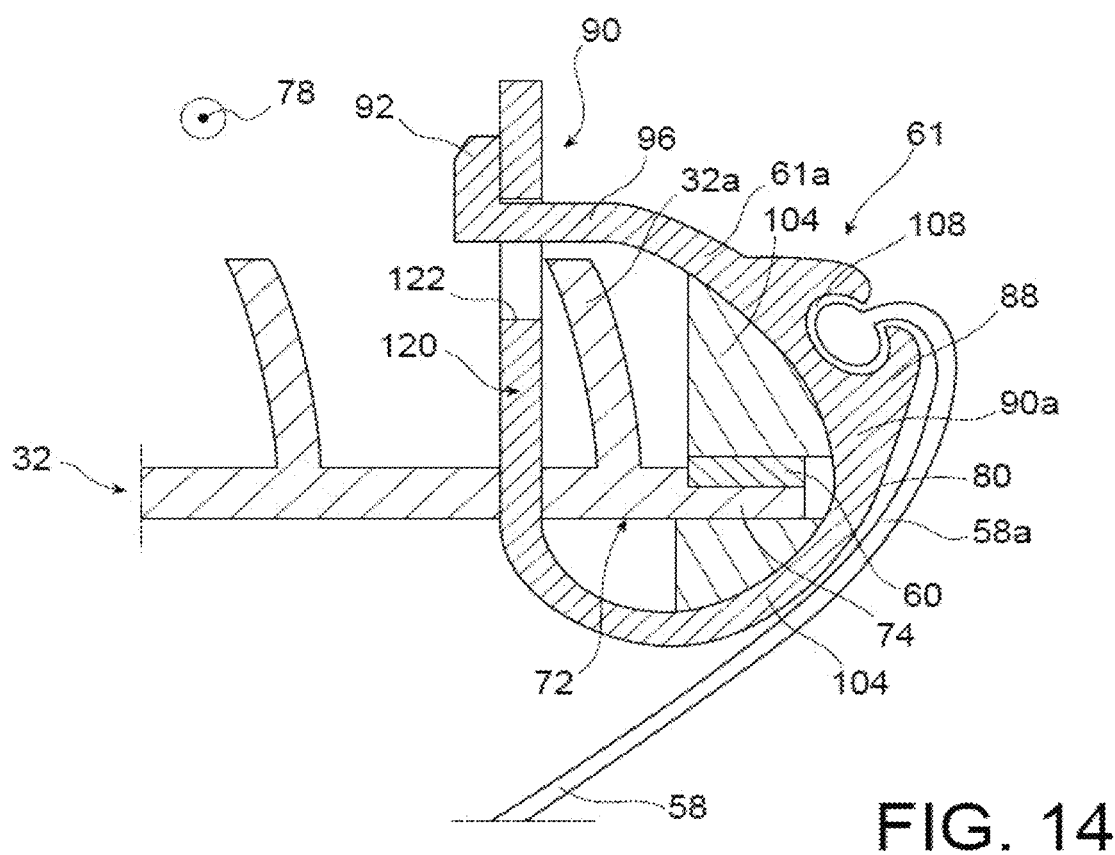
FIG. 14 is a schematic sectional view showing a reverser portion according to a further preferred embodiment of the invention.

According to another preferred embodiment of the invention shown in FIG. 14, the interface device 61 forms an elastic clip 90 which surrounds the structure 72, both by bypassing it from the front, from behind, and radially inward and outward.

To do this, the body 61*a* of the device 61 comprises the protuberance 88 on which the first coupling means 108 of the membrane 58 are located. To the front, several elastic tabs 96 extend spaced circumferentially apart from each other, and each bearing at their end a hook 92 of the clip 90. Each hook 92 cooperates with another clip armature 120 formed inside the body 61*a*, this armature, optionally elastic in nature, bypassing the frame 60 and the bearing member 74 radially inward, then bypassing the last vanes 32*a* radially inward and axially to the front. To do this, this armature 120 can also be in the form of several tabs spaced circumferentially apart from each other.

At its radially external end, the clip armature 120 has openings 122 for the tabs 96 to pass through. In this way, the hooks 92 can bear axially to the rear against the radially external end of the clip armature 120, forcing the latter to bear axially against the last vanes 32*a*.

A rear axial stop against the structure 72 can be provided on the elastic clip 90, for example at the rear portion 90*a* of this clip which bypasses the frame 60, but such a stop is not necessary.

Various modifications can be made by a person skilled in the art to the invention described above, merely by way of non-limiting examples, and the scope whereof is defined by the appended claims. For example, the thrust reverser 30 can alternatively has a "C-duct" or "O-duct" architecture. Furthermore, while the preferred embodiments described above relate to a fixed deflection cascade reverser design, these cascades can alternatively be integrated in the movable structure of the reverser.

The invention claimed is:

1. A thrust reverser for an aircraft propulsion unit, the reverser comprising a fixed structure equipped with a radially internal delimiting wall of a secondary flow path of the propulsion unit through which a secondary flow is intended to pass, the reverser also comprising a movable structure comprising at least one reverser cover equipped with a radially external wall and a radially internal wall forming a radially external delimitation of the secondary flow path, the movable structure being movable in translation with respect to the fixed structure along a longitudinal central axis of the reverser, between a forward direct-thrust position and a retracted reverse-thrust position, the reverser also including a deflection cascade and a sealing membrane to deflect at least one portion of the secondary flow toward the deflection cascade when the movable structure is in the retracted reverse-thrust position, the reverser also including a rear cascade support frame for supporting the deflection cascade,
wherein the reverser includes an interface device between the sealing membrane and a rear cascade structure comprising the rear cascade support frame, the vanes located furthest back on the deflection cascade, and a bearing member via which the cascade bears against the rear cascade support frame, the bearing member projecting behind the vanes located furthest back and also being fastened to the rear cascade support frame,
in that a first end of the sealing membrane is fastened to the interface device via first coupling means,
and wherein the interface device forms an elastic clip mounted around the rear structure, and a rear clip portion of the elastic clip is arranged behind the rear structure.

2. The thrust reverser according to claim 1, wherein the interface device is equipped with anti-rotation means relative to the rear structure, the anti-rotation means being in contact with the rear cascade support frame and/or the bearing member of the deflection cascade.

3. The thrust reverser according to claim 1, wherein the elastic clip includes a hook against any one of the following elements:
the rear cascade support frame;
the vanes located furthest back on the cascade; or
a clip latch itself bearing against the vanes located furthest back on the cascade.

4. The thrust reverser according to claim 3, wherein the hook of the elastic clip is a clamping hook bearing against a front end of the rear cascade support frame, and wherein the elastic clip comprises a rear axial stop bearing against a rear portion of the rear structure, against a rear end of the rear cascade support frame, the clamping hook forcing the rear axial stop forward against the rear portion of the rear structure.

5. The thrust reverser according to claim 4, wherein the elastic clip includes, between the clamping hook and the rear axial stop, flexible means making it possible, when they are moved to a predefined stress state, to disengage the hook from the rear cascade support frame, the flexible means comprising an axial tab.

6. The thrust reverser according to claim 5, wherein the elastic clip also includes, at the end of the clamping hook, gripping means making it possible, under stress, to move the flexible means to said predefined stress state.

7. The thrust reverser according to claim 1, wherein at least one portion of the first coupling means of the membrane is located in front of a rear end of the rear structure.

8. The thrust reverser according to claim 1, wherein the deflection cascade belongs to the fixed structure of the reverser.

9. An aircraft propulsion unit, comprising a turbine engine and a nacelle including at least one fan cover, and a thrust reverser according to claim 1.

10. A method for installing a sealing membrane of a thrust reverser according to claim 1, wherein the sealing membrane comprises the following two steps, carried out in any order:
   fastening the first end of the sealing membrane on the interface device, via the first coupling means,
   moving the movable structure of the reverser to its retracted reverse-thrust position;
   from outside the reverser, clipping the interface device onto the rear structure, and pushing the sealing membrane into the secondary flow path.

\* \* \* \* \*